(12) United States Patent
Miller

(10) Patent No.: US 8,430,938 B1
(45) Date of Patent: Apr. 30, 2013

(54) CONTROL ALGORITHM FOR AUTOTHERMAL REFORMER

(75) Inventor: Steven P. Miller, Gibbstown, NJ (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1480 days.

(21) Appl. No.: 11/894,637

(22) Filed: Jul. 13, 2007

Related U.S. Application Data

(60) Provisional application No. 60/832,009, filed on Jul. 13, 2006.

(51) Int. Cl.
  *G05B 15/00* (2006.01)
  *C01B 3/36* (2006.01)

(52) U.S. Cl.
  USPC ............................................. 48/197 R; 700/3

(58) Field of Classification Search ...... 48/197 R–197 A
  See application file for complete search history.

(56) References Cited

U.S. PATENT DOCUMENTS

| | | | |
|---|---|---|---|
| 4,923,768 A * | 5/1990 | Kaneko et al. | ........... 429/425 |
| 6,348,278 B1 | 2/2002 | LaPierre et al. | |
| 6,376,114 B1 | 4/2002 | Bonville, Jr. et al. | |
| 6,383,670 B1 | 5/2002 | Edlund et al. | |
| 6,641,625 B1 | 11/2003 | Clawson et al. | |
| 6,759,156 B1 | 7/2004 | Wheat et al. | |
| 6,796,332 B1 | 9/2004 | Nguyen et al. | |
| 6,811,908 B2 | 11/2004 | Edlund et al. | |
| 6,893,755 B2 | 5/2005 | Leboe | |
| 6,966,327 B2 | 11/2005 | Nguyen et al. | |
| 7,066,973 B1 | 6/2006 | Bentley et al. | |
| 7,208,241 B2 | 4/2007 | Edlund et al. | |
| 7,802,420 B2 | 9/2010 | Poojary et al. | |
| 7,837,858 B2 | 11/2010 | Sugiura et al. | |
| 7,981,372 B2 | 7/2011 | Yamazaki et al. | |
| 8,100,994 B2 | 1/2012 | Casanave et al. | |
| 2004/0006914 A1* | 1/2004 | Shaaban et al. | ............ 48/197 R |
| 2005/0254960 A1* | 11/2005 | Watkins | ........................... 417/53 |
| 2005/0287407 A1* | 12/2005 | Bushko | ........................... 429/26 |
| 2007/0269690 A1* | 11/2007 | Doshi et al. | ..................... 429/19 |
| 2008/0005963 A1* | 1/2008 | Wheat et al. | ....................... 48/61 |
| 2011/0073809 A1 | 3/2011 | Faulkner | |
| 2012/0014864 A1 | 1/2012 | Lesieur et al. | |

OTHER PUBLICATIONS

U.S. Appl. No. 60/832,009, filed Jul. 13, 2006, invention title "Diesel Fuel Autothermal Reformer Control Algorithm," sole inventor Steven P. Miller.

(Continued)

*Primary Examiner* — Imran Akram
(74) *Attorney, Agent, or Firm* — Howard Kaiser

(57) ABSTRACT

According to typical inventive practice, an algorithm controls a reformer in order to produce a pure hydrogen stream for a hydrogen-using device. The inventive algorithmic feedback control maintains the permeate hydrogen stream at a permeate pressure setpoint. Pressure measurements are performed of the permeate hydrogen stream. Control data (e.g., including a "lookup" table) establishes at least three output levels (scaled from zero output to maximum output) of the permeate hydrogen stream and, for each output level, five variable setpoints (air flow rate, hydrocarbon flow rate, and steam flow rate preceding the reformer reaction; steam flow rate preceding the water-gas shift reaction; shaft rotational speed in the energy recovery device). The pressure signals and the control data are processed to determine the optimal output level and the associated variable setpoints. Control signals are sent to adjust the variables to the determined variable setpoints.

15 Claims, 9 Drawing Sheets

OTHER PUBLICATIONS

Steven P. Miller, John M. Heinzel, John H. Kuseian, Donald J. Hoffman, and Edward M. House, "A Dynamic Model of a Shipboard PEM Fuel Cell Reformer System with an Integrated Gas Turbine," Proceedings of GT 2006, ASME Turbo Expo 2006: Power for Land, Sea, and Air, The 51st Annual Technical Congress & Exposition for the Worldwide Gas Turbine Community, May 8-11, 2006, Barcelona, Spain, American Society of Mechanical Engineers (ASME), GT2006-90739, 8 pages.

Tim Chen, "Investigation of Catalytic Autothermal Reforming Process for Hydrogen Production," Proceedings of the Taiwan Tech Trek 2005 Academic Conference, Taipei, Taiwan, *date(s) uncertain*, pp. 69-83.

A. Ersoz, H. Olgun, S. Ozdogan, C. Gungor, F. Akgun, M. Tiris, "Autothermal Reforming As a Hydrocarbon Fuel Processing Option for PEM Fuel Cell," *Journal of Power Sources*, vol. 118, issues 1-2, May 25, 2003, pp. 384-392.

C. Pereira, J-M Bae, S. Ahmed, and M. Krumpelt, "Liquid Fuel Reformer Development: Autothermal Reforming of Diesel Fuel," Electrochemical Technology Program, Chemical Technology Division, Argonne National Laboratory, Argonne, Illinois, 60439, presented at the U.S. Department of Energy 2000 Hydrogen Program Technical Review, San Ramon, California, May 9, 2000, 13 pages.

U.S. Appl. No. 12/075,268, filed Jan. 29, 2008, invention title "Isothermal Combustion Heated Steam Reformer," last-known status is advisory action mailed May 21, 2012.

\* cited by examiner

| Output Level | Process Controls | | | | |
|---|---|---|---|---|---|
| | ATR Air Flow Rate | ATR Fuel Flow Rate | ATR Steam Flow Rate | WGS Steam Flow Rate | Turbine Speed |
| 0 | 100 | 15 | 30 | 20 | 32000 |
| 25 | 600 | 50 | 80 | 50 | 34000 |
| 50 | 1000 | 80 | 150 | 80 | 36000 |
| 75 | 1500 | 160 | 200 | 120 | 38000 |
| 100 | 2000 | 200 | 250 | 160 | 40000 |

FIG. 9

CONTROL ALGORITHM FOR AUTOTHERMAL REFORMER

CROSS-REFERENCE TO RELATED APPLICATIONS

This application claims the benefit of U.S. provisional patent application No. 60/832,009, filing date 13 Jul. 2006, hereby incorporated herein by reference, invention title "Diesel Fuel Autothermal Reformer Control Algorithm," sole inventor Steven P. Miller.

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

The present invention relates to hydrogen production, more particularly to methods and apparatuses for producing hydrogen from hydrogenous-carbonaceous substances such as natural gas (e.g., methane, ethane, or propane), organic waste, gasoline, diesel fuel, oil, coal, methanol, and ethanol.

Hydrogen, the most abundant element in the universe, usually occurs in nature as an element included in a compound (e.g., hydrocarbonaceous or hydrous) that also includes one or more non-hydrogen elements. Pure hydrogen is non-toxic, odorless, tasteless, colorless, and easily flammable, and burns in daylight with no visible flame.

In order to be a standalone element ($H_2$) that is useful as a fuel, hydrogen must be broken from its bonds with the accompanying element(s). Known methodologies for breaking these bonds include reformation, biomass gasification, coal gasification, and electrolysis of water. Generally speaking, reforming involves the splitting of hydrogen and carbon so as to yield a mixture (known as a "synthesis gas," or "syn-gas") that contains hydrogen ($H_2$) and carbon monoxide (CO). The resultant carbon monoxide (CO) can then be caused to react with steam (gaseous $H_2O$) so as to turn the carbon monoxide (CO) into carbon dioxide ($CO_2$) and release more hydrogen ($H_2$). Electrolysis involves the use of electricity to split water (liquid $H_2O$) into hydrogen ($H_2$) and oxygen ($O_2$). Contemplated but as yet undeveloped methodologies for producing hydrogen include photo-electricity (involving the splitting of water via sunlight), photobiology (involving the splitting of water via sunlight, using organisms such as algae or bacteria), and thermal dissociation (involving the application of extreme heat, via, e.g., solar power or nuclear power, to split hydrogenous compounds without generating carbon dioxide).

Fossil fuels are beset with environmental and economic concerns. Hydrogen fuel represents a viable alternative to fossil fuels, albeit hydrogen is not a perfect fuel. Safety issues are concomitant production, storage and use of hydrogen fuel, and efficiency/cost-effectiveness deficits remain in current hydrogen production implementations. An advantage of hydrogen as a fuel is its capability of being produced from a variety of feed-stocks, including fossil fuels, water, and organic matter. Efforts continue in many countries to improve hydrogen production in terms of safety, efficiency, and cost-effectiveness.

SUMMARY OF THE INVENTION

In view of the foregoing, it is an object of the present invention to provide an improved methodology for producing pure hydrogen from a hydrocarbon (hydrogenous-carbonaceous substance).

The present invention's control algorithm, as typically embodied, controls the process inputs of an autothermal reformer system (such as a diesel fuel autothermal reformer system) in order to provide pure hydrogen. For instance, practice of the present invention can serve to deliver a constant pressure feed stream of pure hydrogen to a hydrogen-using device (such as a proton exchange membrane fuel cell). According to typical inventive practice, the inventive algorithm controls a hydrogen compressor, an autothermal reformer compressor, an autothermal reformer fuel pump, an autothermal reformer water pump, a water-gas shift reactor water pump, and a gas turbine generator. Control of the hydrogen compressor is provided by a PID controller that maintains a constant outlet pressure by varying input power to the compressor motor. A core process controller monitors the hydrogen compressor inlet pressure and varies the other outputs to different steady state operating levels in order to maximize system efficiency while allowing the system to respond to varying load levels on the hydrogen-using device (e.g., fuel cell).

Practice of the inventive control algorithm can render a thermal reformer system more responsive to rapid changes in system load, and more capable of operating at maximum efficiency during steady state conditions. Moreover, the inventive control algorithm can prevent the thermal reformer system from experiencing stall, premature shutdown, and dangerous conditions such as overheating, over-pressurization, and over-speeding.

In accordance with many embodiments of the present invention, the present invention's computer program product is used in association with a reformer system in which: an autothermal reaction is performed to combine oxygen-containing gas (e.g., air), hydrocarbon (e.g., fuel), and steam and to produce a mixture containing hydrogen and carbon monoxide; a water-gas shift reaction is performed to combine steam with the mixture produced by the autothermal reaction and to produce a mixture containing hydrogen and carbon dioxide; membrane separation is performed of hydrogen from non-hydrogen ingredients of the mixture produced by the water-gas shift reaction so as to produce a permeate hydrogen stream; and, energy is produced using shaft rotation. The inventive computer program product includes a computer-useable medium having computer program logic recorded thereon for enabling the computer to maintain constancy of the permeate hydrogen stream at a permeate pressure setpoint. The computer program logic includes: means for enabling the computer to receive signals indicative of the pressure of the permeate hydrogen stream; means for enabling the computer to access control data; means for enabling the computer to process the received signals and the control data so as to determine the optimal permeate hydrogen stream output level, the optimal output level resulting in restoring the pressure of said permeate hydrogen stream to said permeate pressure setpoint; means for enabling the computer to transmit control signals to adjust the variables in accordance with the group of subordinate setpoints that corresponds to the optimal output level. The control data includes plural (at least three) output levels, on a scale from zero output to maximum output, of the permeate hydrogen stream. The control data further includes plural subordinate setpoints. Each output level has corresponding thereto a group of (e.g., five) subordinate setpoints. Each subordinate setpoint represents one of plural (e.g., five) variables, including: the mass flow rate of the oxygen-containing gas prior to the autothermal reaction; the mass flow rate of the hydrocarbon prior to the autothermal reaction; the mass flow rate of the steam prior to the autothermal reaction; the mass flow rate of the steam prior to the water-gas shift reaction; and, the speed of the shaft rotation. As the present invention is frequently practiced, cooling and compressing of the permeate hydrogen stream is performed in the reformer system so as to produce a delivery hydrogen stream. The computer program logic is further for enabling the computer to maintain constancy of the delivery hydrogen stream at a delivery pressure setpoint. The control data further includes the delivery pressure setpoint. The computer program logic further includes: means for enabling the computer to receive signals indicative of the pressure of the delivery hydrogen stream; and, means for enabling said computer to transmit control signals to adjust the pressure of the delivery hydrogen stream in accordance with the delivery pressure setpoint.

Various aspects of the present invention are disclosed in the following paper, incorporated herein by reference: Steven P. Miller, John M. Heinzel, John H. Kuseian, Donald J. Hoffman and Edward M. House, "A Dynamic Model of a Shipboard PEM Fuel Cell Reformer System with an Integrated Gas Turbine," Proceedings of GT 2006, ASME Turbo Expo 2006: Power for Land, Sea, and Air, The 51st Annual Technical Congress & Exposition for the Worldwide Gas Turbine Community, May 8-11, 2006, Barcelona, Spain, American Society of Mechanical Engineers (ASME), GT2006-90739 (8 pages).

Other objects, advantages and features of the present invention will become apparent from the following detailed description of the present invention when considered in conjunction with the accompanying drawings.

BRIEF DESCRIPTION OF THE DRAWINGS

The present invention will now be described, by way of example, with reference to the accompanying drawings, wherein:

FIG. 9 is an example of a control table suitable for use by an inventive autothermal reformer control algorithm such as shown in FIG. 7.

DETAILED DESCRIPTION OF THE INVENTION

Reference is now made to FIG. 1 through FIG. 6, which illustrate an autothermal reformer system suitable for practice of inventive algorithmic control. The autothermal reformer system being controlled by the present invention includes three reactors, a separation membrane, a sorbent bed, heat exchangers, pumps, compressors, and a turbine. The inventive algorithm can be practiced in association with an autothermal reformer system lacking a sorbent bed. The United States Navy has demonstrated an autothermal reformer system test prototype similar to that diagrammatically represented in FIG. 1. It is emphasized that the present invention admits of practice involving diesel fuel or any of a variety of other hydrocarbons. It is further emphasized that the present invention admits of practice involving delivery of pure hydrogen to a fuel cell-type device (e.g., fuel cell stack) or to any of a variety of other hydrogen-using devices.

Figure 1:
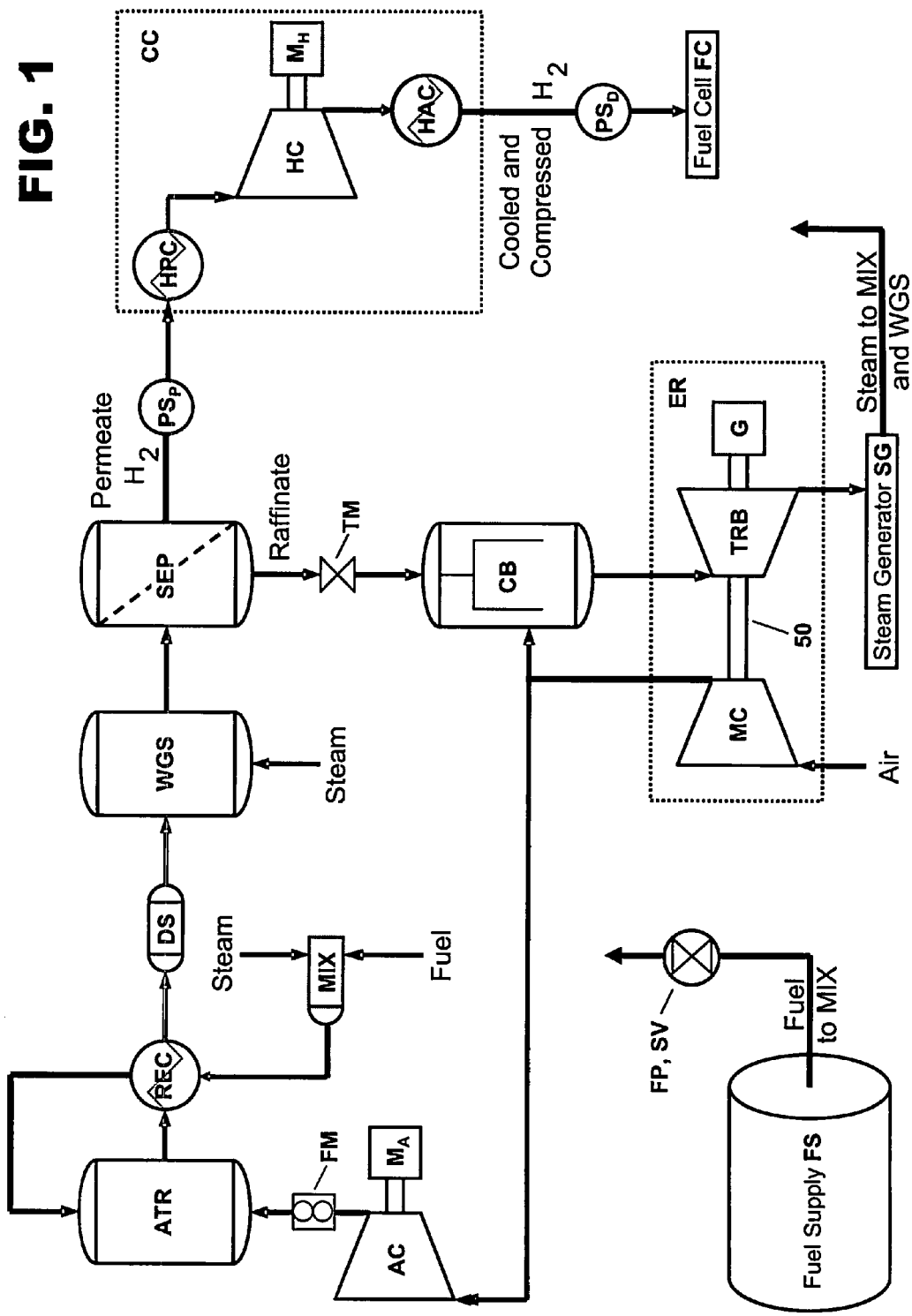
FIG. 1 is a schematic of a fuel cell reformer system suitable for association with a control algorithm in accordance with the present invention.
Figure 2:
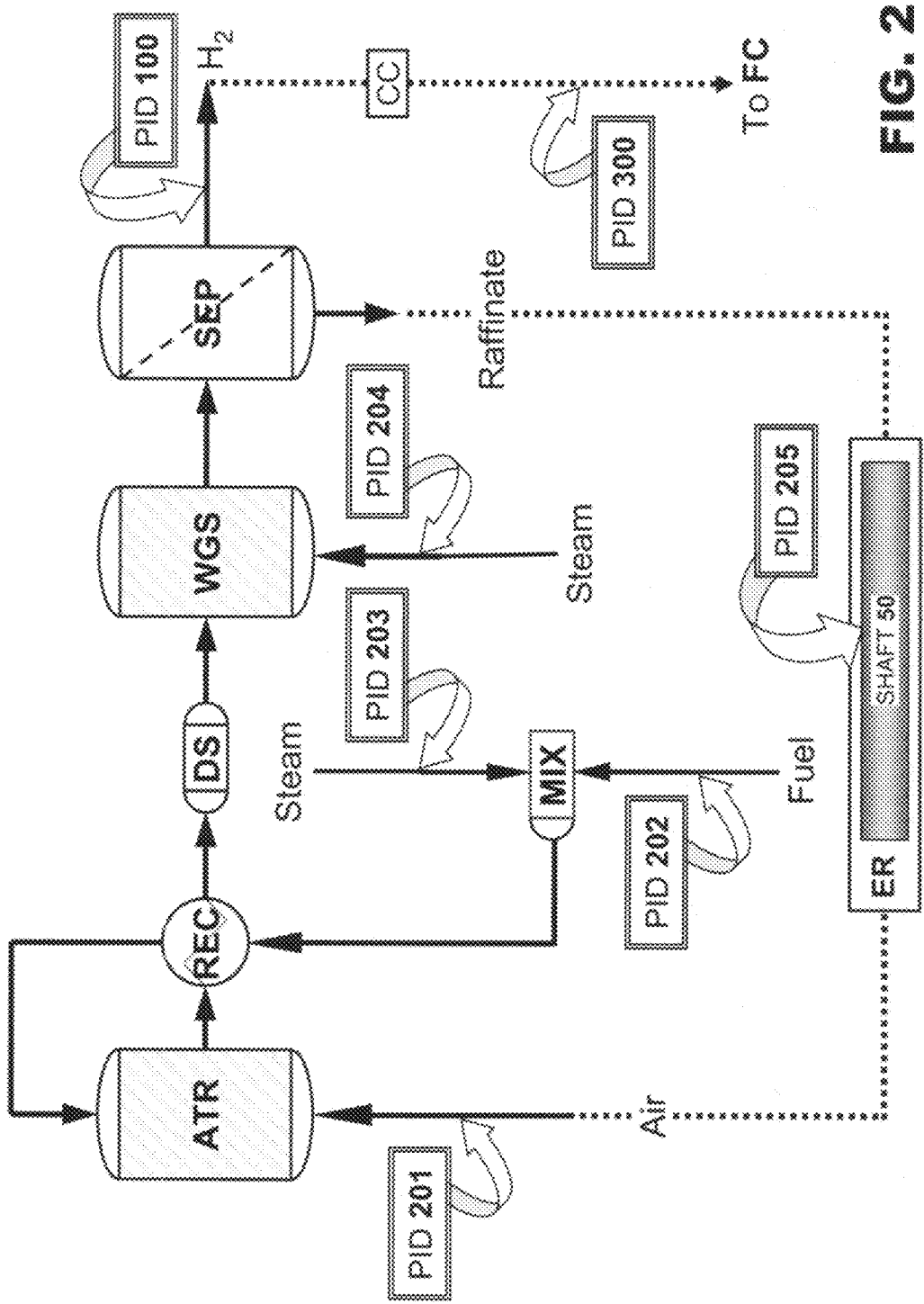
FIG. 2 is a simplified and amplified version of the reformer system schematic shown in FIG. 1, additionally indicating control points in accordance with an embodiment of an inventive algorithmic control system.
Figure 4:
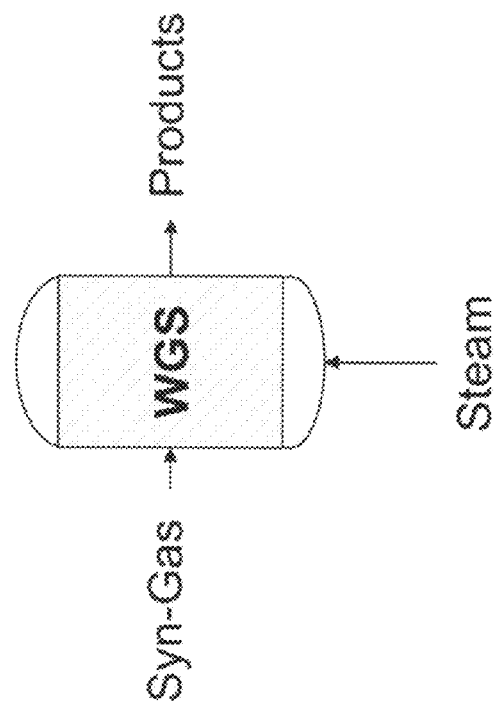
FIG. 4 is a schematic of the water-gas shift reactor shown in FIG. 1 and FIG. 2.
Figure 3:
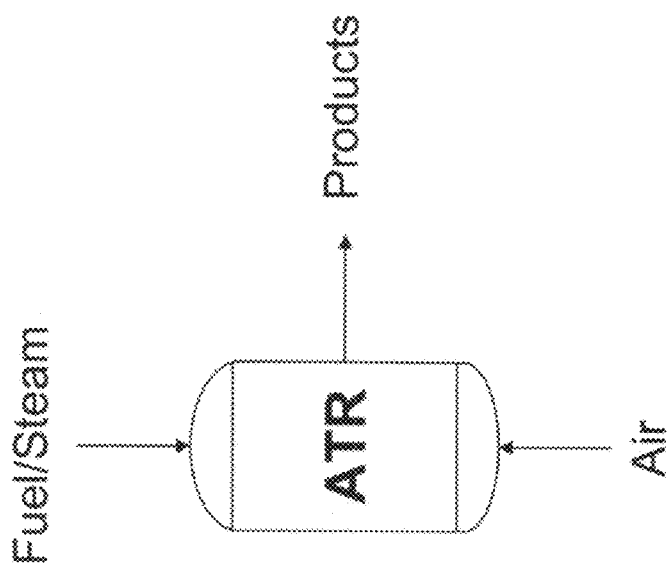
FIG. 3 is a schematic of the autothermal reformer shown in FIG. 1 and FIG. 2.
Figures 5, 6:
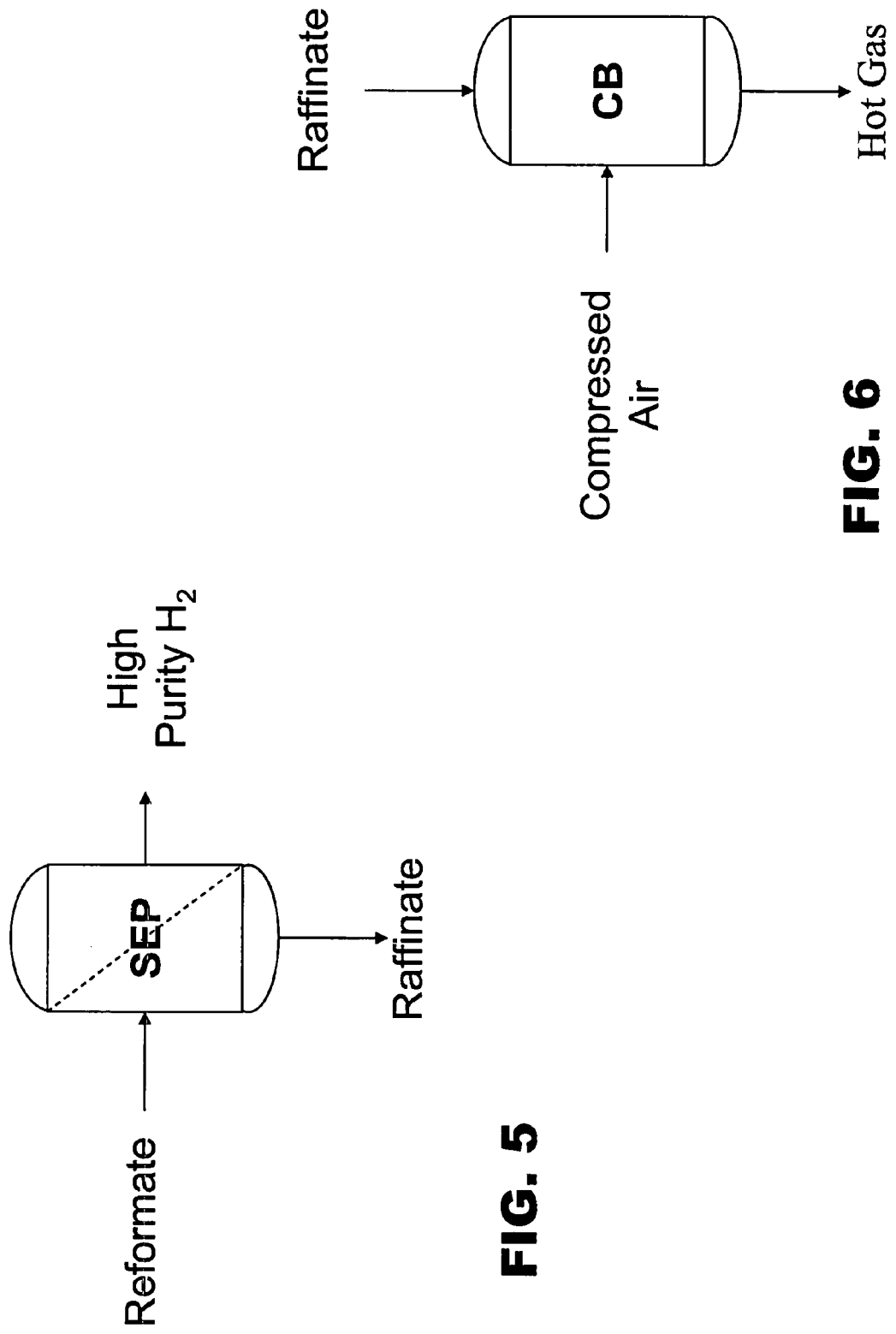
FIG. 5 is a schematic of the membrane separator shown in FIG. 1 and FIG. 2.
FIG. 6 is a schematic of the catalytic burner shown in FIG. 1.

In this diesel fuel autothermal reformer system, three ingredients (compressed air, high pressure steam, and pressurized diesel fuel) are injected into an autothermal reformer reactor ATR. Particularly as depicted in FIG. 1 through FIG. 3, autothermal reformer reactor ATR accepts diesel fuel, steam and air as inputs, and provides a hot syn-gas ($H_2$ and CO) mixture (also known as the "reformate") as output. Diesel fuel, steam, and air are fed to autothermal reformer reactor ATR from fuel supply FS, steam generator SG, and energy recovery device ER, respectively. According to typical inventive practice, the respective flow rates of the fuel, steam, and air entering the autothermal reformer reactor ATR are three of the variables controlled by the inventive control algorithm.

Autothermal reformer reactor ATR is essentially a pressure vessel containing a bed of catalysts suitable for the reaction chemistry. The fuel, air, and steam all react together to form a single product mixture that is approximately at chemical equilibrium. The product mixture put out by autothermal reformer reactor ATR depends on the composition of the inlet stream as well as the temperature of the products. Typically, the air supplied is only a fraction (in the neighborhood of 10%) of the theoretical amount required to fully oxide the fuel. The oxidation of the fuel releases significant amounts of heat. The steam also reacts with the products of the oxidation reaction to product hydrogen and methane. These reactions may release or absorb heat. The temperature of the products thus depends on the composition and temperature of the reactants. The products (the "reformate" stream) are typically at a pressure similar to the inlet. In the U.S. Navy's autothermal reformer system prototype, the pressure in the autothermal reformer reactor ATR was nominally 7 atmospheres.

According to the autothermal reformer system embodiment described herein, the autothermal reformer reactor ATR is run in such a way as to maximize hydrogen production. Inevitably, significant amounts of carbon monoxide (CO) are produced, as well. Other products include nitrogen ($N_2$), carbon dioxide ($CO_2$), water vapor ($H_2O$), and methane ($CH_4$). Any sulfur (S) that was present in the fuel put into autothermal reformer reactor ATR is converted by autothermal reformer reactor ATR into hydrogen sulfide ($H_2S$). The products of autothermal reformer reactor ATR are then cooled by passing through recuperator REC, which acts as a heat exchanger. Recuperator REC recycles some of the heat released by the reactions of autothermal reformer reactor ATR. The mixture exits recuperator REC and then passes through gas phase desulfurizer DS, a sorbent bed that adsorbs the hydrogen sulfide, thus removing it from the gaseous mixture.

The remaining gases then enter the water-gas shift reactor WGS. In addition, some supplemental steam that is fed from steam generator SG is also added at this stage. According to typical inventive practice, the flowrate of this separately provided steam entering water-gas shift reactor WGS is one of the variables controlled by the inventive control algorithm. Water-gas shift reactor WGS is a catalytic reactor similar to autothermal reformer reactor ATR, but differs insofar as using a special catalyst that only allows the water-gas shift reaction to take place. The water-gas shift reaction combines carbon monoxide and steam to form hydrogen gas and carbon dioxide: $CO+H_2O \rightarrow CO_2+H_2$. This reaction needs to take place at a temperature lower than the temperature at which autothermal reformer reactor ATR operates.

Next, the products of water-gas shift reactor WGS enter membrane separator SEP, a hydrogen separation membrane vessel containing a special membrane that permits only hydrogen to permeate through. The gases that do not permeate through membrane separator SEP are called the "retentate." Typically, about 70-90% of the hydrogen permeates through membrane separator SEP to form a very high purity hydrogen gas that exits therefrom at sub-atmospheric pressure. The membrane selectively permeates hydrogen so as to permit less than 1 ppm of sulfur or carbon monoxide to pass through. The retentate gases exit the membrane to form the raffinate stream, which are still at a pressure similar to that of the reformate stream. The reason for the difference in pressures is that the permeation is driven by pressure differentials, and thus the reformate must be supplied at high pressure, and the pressure on the permeate side of the membrane must be held low.

The high purity hydrogen is pulled through membrane separator SEP by a vacuum applied to the permeate side of membrane separator SEP. This vacuum is created by hydrogen compressor HC, a compressor (e.g., a variable speed positive displacement compressor) that is driven by motor $M_H$. Hydrogen compressor HC brings the hydrogen gas up to the pressure required by the fuel cell stack FC to operate. The combination including hydrogen precooler HPC, hydrogen compressor HC, and hydrogen aftercooler HAC is styled herein a cooling and compression (increased pressurization) device CC. The speed of hydrogen compressor HC is one of the variables that are controlled by the inventive control algorithm. Since this compression by hydrogen compressor HC generates heat, and the hydrogen gas permeating through the membrane separator SEP is already at high temperatures (typically above 400 Celsius), heat exchangers HPC and HAC are positioned upstream and downstream, respectively, of the hydrogen compressor HC to cool the hydrogen gas. After passing through the second heat exchanger (HAC), the hydrogen gas is sent to the fuel cell FC for consumption.

Meanwhile, the raffinate gases proceed to a catalytic burner reactor CB, a pressure vessel and catalyst bed that is similar to autothermal reformer reactor ATR and water-gas shift reactor WGS. Prior to entering catalytic burner CB, the raffinate gases pass through a throttling mechanism TM to drop in pressure down to a nominal pressure of 3 atmospheres. Throttling mechanism TM, located upstream of catalytic burner CB, would ideally be a regulating valve that would maintain a fixed pressure on the retentate side of the separation membrane regardless of flowrate; however, the model wherein the inventive algorithm was first demonstrated used a fixed geometry orifice, and thus the pressures would vary with flowrate. Catalytic burner CB combines the raffinate gases with compressed air to oxide the remaining combustible species in the raffinate stream. The catalysts aid the combustion of the raffinate with the air. The product is a mixture of carbon dioxide, water vapor, residual oxygen, and nitrogen at high temperature. Catalytic burner CB thus provides hot compressed gas for energy recovery device ER.

Energy recovery device ER includes main compressor MC, turbine expander TRB, generator G, and turbine shaft 50. The combination including main compressor MC, turbine expander TRB, generator G and shaft 50 can be embodied as a commercially available microturbine. The combustion products of catalytic burner CB enter turbine expander TRB, where the combustion products are allowed to expand and depressurize. In the process, a significant amount of shaft 50 power is generated. This shaft 50 power is used to drive main compressor MC (e.g., a centrifugal compressor) in order to partially compress the air being supplied to the autothermal reformer reactor ATR, and in order to supply compressed air for the catalytic burner CB reaction.

Due to the high operating pressure of the autothermal reformer reactor ATR, a second compression stage is required. The partially compressed air that exits main compressor MC is compressed again by a second compressor, viz., autothermal reformer reactor (ATR) compressor AC, before being injected into the autothermal reformer reactor ATR. The ATR compressor AC (e.g., a variable speed positive displacement type), driven by motor $M_A$, is capable of controlling the flowrate of air entering into the autothermal reformer reactor ATR. According to typical inventive practice, the speed of motor $M_A$ is one of the variables that are controlled by the inventive control algorithm.

Turbine expander TRB generates more power than is required by main compressor MC; therefore, a generator G is fitted to the turbine shaft 50 to absorb the excess power and generate electricity. The amount of power produced by generator G is one of the variables controlled by the inventive control algorithm as typically practiced. Reducing the load on generator G will allow the shaft 50 to accelerate; on the other hand, increasing the load on generator G will cause the shaft 50 to decelerate. In the inventive prototypical system tested by the U.S. Navy, generator G was set to maintain a fixed shaft 50 speed. When mounted on a single shaft 50, the main compressor MC, the turbine expander TRB, and the generator G together constitute a microturbine-like assembly, as it bears similarity to commercially available microturbine generator units; in fact, some inventive embodiments can implement an off-the-shelf microturbine unit for such energy recovery purposes.

According to typical inventive practice, in order to provide stable and efficient operation, the inventive control algorithm should maintain an optimal steam-to-carbon ratio and air-to-fuel ratio within autothermal reformer reactor ATR. Further, the inventive control algorithm should maintain an optimal steam-to-carbon ratio in water-gas shift reactor WGS. Moreover, with regard to selecting a suitable or optimal permeate hydrogen pressure, it may be worthy of consideration that membrane separator SEP may tend to operate more efficiently when the permeate hydrogen pressure is lower, whereas hydrogen compressor HC may tend to operate more efficiently when the permeate hydrogen pressure is higher. Catalytic burner CB requires a stoichiometric flow of air from main compressor MC in order to fully oxidize the raffinate flow from membrane separator SEP.

After passing through the turbine expander TRB, the combustion products enter a heat recovery steam generator SG, which is a heat exchanger that uses the hot exhaust products to boil water for steam. The steam produced by steam generator SG is used as respective feeds for autothermal reformer reactor ATR and water-gas shift reactor WGS. As pointed out hereinabove, according to typical inventive practice, these two steam flowrates, entering autothermal reformer reactor ATR and water-gas shift reactor WGS, respectively, are two of the variables controlled by the inventive control algorithm. The combustion products are then exhausted.

Figure 7:
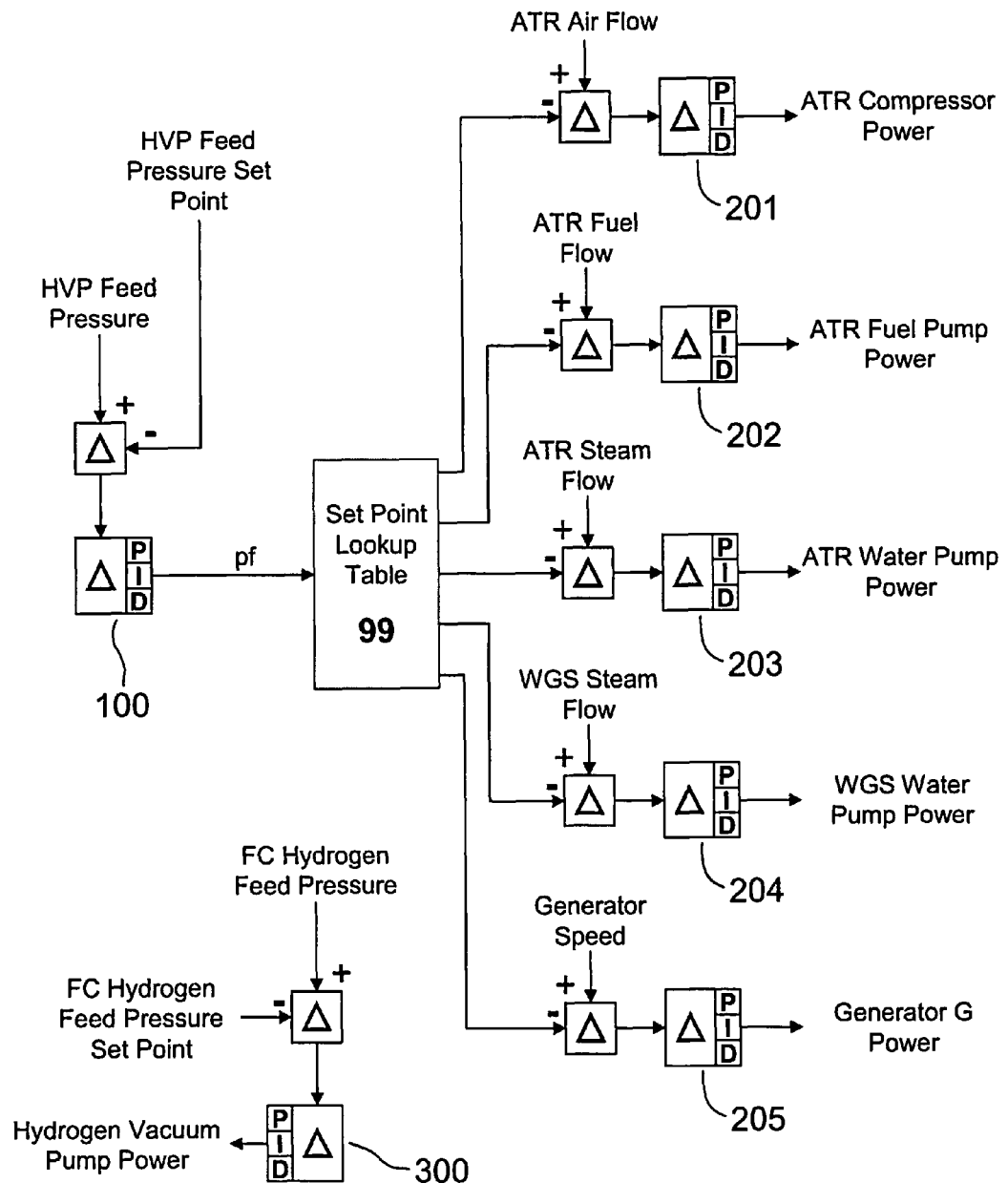
FIG. 7 is a diagram of the process control logic of an embodiment of an autothermal reformer control algorithm in accordance with the present invention.
Figure 8:
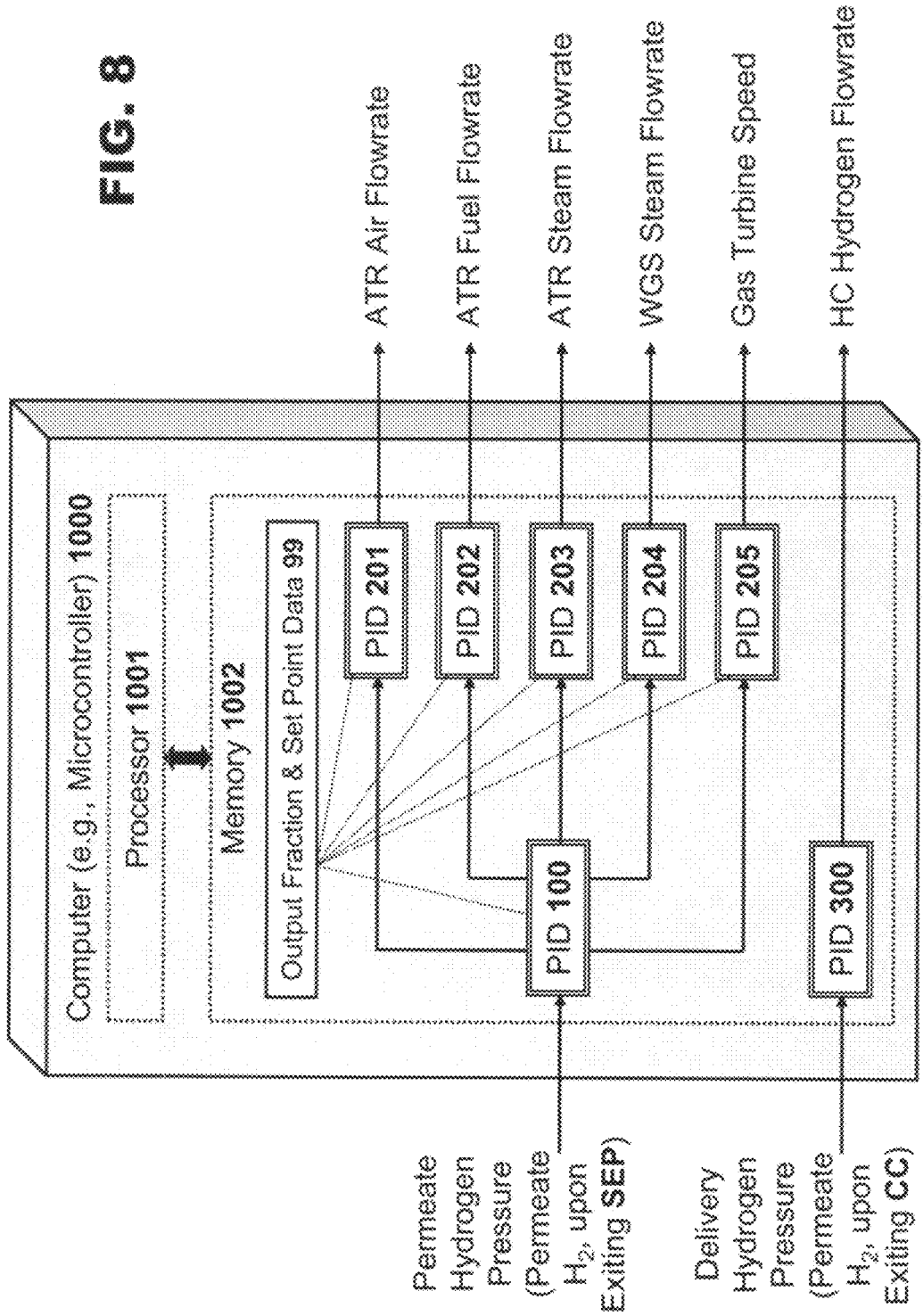
FIG. 8 is a computer schematic representing the inventive control logic illustrated in FIG. 7.

Still with reference to FIG. 1 through FIG. 6, and also with reference to FIG. 7 through FIG. 9, the inventive control algorithm monitors two primary hydrogen pressure variables. Particularly as shown in FIG. 8, the first primary hydrogen pressure variable is the hydrogen permeate stream pressure—i.e., the pressure of the hydrogen stream immediately exiting membrane separator SEP. The second primary hydrogen pressure variable is the hydrogen delivery stream pressure—i.e., the pressure of the hydrogen stream immediately exiting cooling and compression device CC (e.g., immediately exiting hydrogen aftercooler HAC). In other words, the hydrogen delivery stream pressure is the pressure of the hydrogen stream being delivered to a hydrogen-using device such as a fuel cell FC.

The inventive algorithm thus has two main algorithmic control components that are independent of each other. The first main algorithmic control component monitors the hydrogen permeate stream pressure and controls the autothermal reformer system at several junctures in order to maintain constancy of the hydrogen permeate stream pressure. This first main algorithmic control component is more complicated than the second main algorithmic control component, which monitors the hydrogen delivery stream pressure and controls (via motor $M_H$) the speed of the hydrogen compressor HC in order to maintain constancy of the hydrogen delivery stream pressure (at the delivery hydrogen pressure setpoint). As illustrated in FIG. 2, FIG. 7, and FIG. 8, the first main algorithmic control component involves master PID controller 100 and subordinate PID controllers 201, 202, 203, 204, and 205; the second main algorithmic control component involves HD component 300.

According to typical inventive practice, both main algorithmic control components implement Proportional-Integral-Derivative (PID) algorithmic control code. A HD controller is a control loop feedback mechanism commonly known and widely utilized in a variety of industrial contexts. Generally speaking, the "setpoint" (or "set point" or "set value") is the target value that a PID controller automatically and continually strives to reach. A PID controller algorithm usually involves a "Proportional" mode, an "Integral" mode, and a "Derivative" mode. The "error" (the difference between the setpoint and the measured value) is repeatedly corrected by the PID controller. In each correction the PID controller outputs, to a control element, a value representing a weighted sum of the three PID control modes, thereby bringing the diverging measured value back to the setpoint. PID-type control can be effected in the absence of one or two of the PID control modes. For instance, a HD controller that does not effect derivative mode is, technically speaking, a "PI" controller. As another example, a PID controller that effects neither proportional mode nor derivative mode is, technically speaking, an "I" controller; in fact, the present inventor has found that exercising "I" control, only, can work adequately in the context of practicing the present invention. For purposes of the instant disclosure, the term "PID," when used to modify terms such as "controller," "control" or "algorithm," denotes one, two or all three PID control modes. As an alternative to PID controllers, analytical controllers can be inventively implemented that are based on dynamics of various devices included in the autothermal reformer system; however, PID controllers are conventionally used in industry, and analytical controllers are far less common and far more expensive.

According to the present invention's first main algorithmic control component, the hydrogen permeate stream pressure setpoint (i.e., the target constancy of the hydrogen permeate stream pressure) is maintained by sensing the hydrogen permeate stream pressure via pressure sensor $PS_P$, and by controlling various parameters as elaborated upon hereinbelow. According to the present invention's second main algorithmic control component, the hydrogen delivery stream pressure setpoint (i.e., the target constancy of the hydrogen delivery stream pressure) is maintained by sensing the hydrogen delivery stream pressure via pressure sensor $PS_D$, and by controlling, through adjustment of motor $M_H$, the speed of the hydrogen compressor HC. According to typical inventive practice, the setpoint for the delivery hydrogen pressure is significantly higher than the setpoint for the permeate hydrogen pressure. For instance, in the inventive prototype, the permeate hydrogen pressure setpoint was about 0.3 atmospheres, and the delivery hydrogen pressure setpoint was about 1.5 atmospheres. Constancy is separately maintained of both the permeate hydrogen pressure and the delivery hydrogen pressure. The maintenance of a constant differential between the permeate hydrogen pressure and the delivery hydrogen pressure furthers the efficiency of the autothermal reformer system.

The first main algorithmic control component monitors the hydrogen pressure of the permeate side of the separation membrane SEP. This hydrogen pressure is maintained at a constant value (the permeate hydrogen pressure setpoint) by controlling several other control points of the autothermal reformer system, including the following: the air flow rate to the autothermal reformer reactor ATR; the fuel flow rate to the autothermal reformer reactor ATR; the steam flow rate to the autothermal reformer reactor ATR; the steam flow rate to the water-gas shift reactor WGS; and, the rotational speed of turbine generator G (in energy recovery device ER).

As shown in FIG. 1 and FIG. 2, the ATR steam and the ATR fuel are mixed together in mixer MIX, prior to being conveyed to autothermal reformer reactor ATR. The ATR fuel flow rate and the ATR steam flow rate are each controlled prior to being mixed in mixer MIX. Even if the thermal reformer system were configured without a mixer, the present invention would be similarly practiced so as to control the fuel flow rate and the steam flow rate. The present invention can be practiced in association with a variety of thermal reformer configurations. Of particular note, it is not necessary that the steam and fuel be mixed prior to conveyance to a reformer reactor, as they can be separately conveyed to the reformer reactor. Otherwise stated, regardless of whether or not the fuel and the steam are mixed prior to being conveyed to the reformer reactor, the fuel flow rate and the steam flow rate can be independently controlled in accordance with inventive principles.

The present invention's first main algorithmic control component features the simultaneous control and balancing of these five subordinate variables. The air flow rate to the autothermal reformer reactor ATR is controlled by adjusting the electrical power applied to the motor $M_A$ (and hence, for instance, the speed of autothermal reformer reactor compressor AC, to which the motor $M_A$ is attached). The fuel flow rate to the autothermal reformer reactor ATR is controlled by adjusting the ATR fuel pump FP; alternatively, an electrically controlled valve SV such as a servo valve can be used instead of a fuel pump FP, and the fuel flow rate can be controlled by adjusting the electrically controlled valve SV. As further described hereinbelow with reference to FIG. 10 through FIG. 13, the steam flow rate to the autothermal reformer reactor ATR is controlled by adjusting a water pump or a steam valve that is associated with a steam generator SG, and the steam flow rate to the water-gas shift reactor WGS is similarly controlled by adjusting a water pump or a steam valve that is associated with the same steam generator SG. The rotational speed of energy recovery device ER's shaft 50, which turns turbine expander TRB and main compressor MC, is controlled by adjusting the electrical load applied to, and hence the power produced by, generator G.

Established in accordance with typical inventive practice is a set of "look-up" data such as a control table 99, shown by way of example in FIG. 9 and contextually depicted in FIG. 7 and FIG. 8. Control table 99 correlates different permeate hydrogen output levels with specific autothermal reforming process parameters. The permeate hydrogen output levels are measured as a fraction of maximum hydrogen output. As shown in FIG. 9, the permeate hydrogen output levels are on a percentage-based fractional scale from 0 to 100, which is equivalent to a purely (unitary) fractional scale from 0 to 1. Either (percentage-based or unitary) fractional denotation can be suitable for inventive practice. The permeate hydrogen output level is a dimensionless value having no inherent physical basis, and is solely used as an index for the inventive control table 99. The permeate hydrogen output level primarily relates to the mass flow rate (e.g., in kg/hr) of the permeate hydrogen stream. The terms "flow rate," "mass flow rate" and "mass flow" are used synonymously herein. Each output fraction entry in the permeate hydrogen output level column of control table 99 has, corresponding thereto along the same row, setpoint entries for the five process controls (ATR air mass flow rate, ATR fuel mass flow rate, ATR steam mass flow rate, WGS steam mass flow rate, turbine generator speed) of the present invention's first main algorithmic control component.

As diagrammed in FIG. 8, computer 1000 includes a processor 1001 and a memory 1002. According to frequent inventive practice, computer 1000 is embodied as a commercially available microcontroller, which conventionally describes a computer chip that includes a processor (e.g., CPU), a non-volatile memory (e.g., ROM or flash) for a computer program, a volatile memory (e.g., RAM) for input and output, a clock, and an input-output (I-O) control unit. Lookup table 99 (the set of data listing or otherwise indicating output fractional setpoints, from zero to one or from zero percent to one hundred percent, and their corresponding subordinate setpoints) is input (e.g., installed) in the non-volatile component of memory 1002. Also input (e.g., installed) in the non-volatile component of memory 1002 is the PID controller software code containing the functions for PID controllers 100, 201, 202, 203, 204, 205, and 300. The present invention is typically practiced so that computer 1000 describes a computer unit containing and effecting all of the storage, processing and control functions in accordance with the present invention; here, the PID controllers are actually not individual pieces of hardware, but are actually individual software and data components, along with the lookup table 99, of the inventive algorithmic control computer program product that is executable by processor 1001.

In an ongoing manner, computer 1000 receives from pressure sensor $PS_P$, into the volatile component of memory 1002, electrical signals indicative of the permeate hydrogen pressure. Using lookup table 99, master PID controller 100 finds the appropriate permeate hydrogen output level and translates therefrom to each of the five subordinate setpoints. Master PID controller 100 communicates with each of the subordinate PID controllers 201, 202, 203, 204, and 205. Each of the subordinate PID controllers 201, 202, 203, 204, and 205 communicates with a regulative device in the autothermal reformer system. At a given moment in time, PID controller 100, the master PID controller in the first main inventive algorithmic control component, processes this signal so as to determine the appropriate value of hydrogen permeate output level, such as encompassed by the output level values listed in the leftmost tabular column of FIG. 9. PID controller 100 also determines, corresponding to that determined appropriate value of hydrogen permeate output level, the appropriate setpoint values of the five subordinate variables, such as encompassed by the subordinate setpoint values listed in the remaining tabular columns of FIG. 9. Once the setpoint setting is obtained by PID controller 100 for each of the individual subordinate process controls, each of these subordinate setpoint values is fed by master PID controller 100 to a different subordinate PID controller. Each subordinate PID controller controls the corresponding hardware. For instance, the ATR air flow rate is transmitted by PID controller 100 to PID controller 201, which changes the speed of the ATR compressor AC. The ATR fuel flow rate is transmitted by PID controller 100 to PID controller 202, which changes the setting of the fuel pump FP (or the electrically controlled valve SV). The ATR steam flow rate is transmitted by PID controller 100 to PID controller 203, which changes the setting of the water pump WP or $WP_A$. The WGS steam flow rate is transmitted by PID controller 100 to HD controller 204, which changes the setting of the water pump WP or $WP_W$. The turbine speed is transmitted by PID controller 100 to PID controller 205, which changes the load on the generator G.

In comportment with lookup table 99, PID controller 100 sends an electrical communicative signal indicative of the appropriate subordinate setpoint value to each of the five subordinate PID controllers, viz., PID controllers 201, 202, 203, 204, and 205. HD controller 100 signals to PID controller 201 the appropriate setpoint value for the ATR air flow rate, which is the value of the mass flow rate (e.g., in kilograms/hour) of air entering autothermal reformer reactor ATR. In response to the signal received from PID controller 100, PID controller 201 receives an electrical communicative signal from flow meter FM and sends an electrical control signal to ATR compressor AC (to change its speed) to adjust the ATR air flow rate to the setpoint value. PID controller 100 signals to PID controller 202 the appropriate setpoint value for the ATR fuel flow rate, which is the value of the mass flow rate (e.g., in kg/hr) of fuel (more generally, hydrocarbon) entering mixer MIX. In response to the signal received from PID controller 100, PID controller 202 sends an electrical control signal to fuel pump FP (or to electrically controlled valve SV) to adjust the ATR fuel flow rate to the setpoint value. PID controller 100 signals to PID controller 203 the appropriate setpoint value for the ATR steam flow rate, which is the value of the mass flow rate (e.g., in kg/hr) of steam entering mixer MIX. In response to the signal received from PID controller 100, PID controller 203 sends an electrical control signal to steam generator SG, or to water pump WP or $WP_A$, to adjust the ATR steam flow rate to the setpoint value. PID controller 100 signals to PID controller 204 the appropriate setpoint value for the WGS steam flow rate, which is the value of the mass flow rate (e.g., in kg/hr) of steam entering water-gas shift reactor WGS. In response to the signal received from PID controller 100, PID controller 204 sends an electrical control signal to steam generator SG, or to water pump WP or $WP_W$, to adjust the WGS steam flow rate to the setpoint value. PID controller 100 signals to PID controller 205 the appropriate setpoint value for the rotational speed of turbine shaft 50. In response to the signal received from PID controller 100, PID controller 205 sends an electrical control signal to electrical generator G to adjust the turbine shaft 50 rotational speed.

The lookup table (control data) 99 is created by recording various setpoints for each of the five subordinate control variables. The optimal steady state operating points are recorded for various permeate hydrogen output levels ranging between the upper hydrogen flow rate limit (e.g., hydrogen output level 100%, as shown in FIG. 9) and the lower hydrogen flow rate limit (e.g., hydrogen output level 0%, as shown in FIG. 9). Lookup table 99 is based on tabulation of these steady state operating points. The primary index of lookup table 99 is the permeate hydrogen output level, a fraction representing the total permeate hydrogen flow rate divided by the maximum sustainable permeate hydrogen flow rate. The permeate hydrogen output level ranges from zero to one (or from zero percent to one hundred percent), where zero (or zero percent) indicates an idle condition, and one (or one hundred percent) represents a maximum output condition.

These recorded setpoints can be interpolated or curve-fit, by the inventive practitioner (e.g., with computer assistance) prior to input, and/or by PID controller 100 subsequent to input of lookup table 99, to determine other hydrogen output target values (setpoints) for the inventive control algorithm. As a general rule, the more data points are taken, the better the accuracy of the inventive algorithm. Two techniques, among others, for determining these data points are optimization of a steady state model, and experimentation with actual hardware. The inventive practitioner can exercise discretion as to the comprehensiveness of the set of hydrogen permeate pressure setpoint values that are input in memory 1002. For instance, lookup table can constitute relatively few permeate hydrogen output levels and their corresponding subordinate setpoints (ATR air flow rate, ATR fuel flow rate, ATR steam flow rate, WGS steam flow rate, turbine speed), such as the five tabular rows shown in FIG. 9; with fewer output levels input in the non-volatile component of memory 1002, it is left to PID controller 100 to perform a greater degree of the mathematics (e.g., interpolation or curve-fit) for determining the "in-between" values of permeate hydrogen output levels and their corresponding "in-between" subordinate setpoints. When the output level designated by PID controller 100 does not match one of the output levels listed in lookup table 99, the five subordinate setpoint values are linearly interpolated. Alternatively, the inventive practitioner and/or the PID controller 100 uses curve fits instead of discrete data points.

According to typical inventive practice of the first main algorithmic control component of the inventive control algorithm, the inventive control algorithm tracks and changes the permeate hydrogen output level of the autothermal reformer system in order to maintain constancy of the hydrogen permeate pressure. During operation, master PID controller 100 monitors the permeate hydrogen pressure and designates a permeate hydrogen output level appropriate to maintaining the desired permeate hydrogen pressure. Depending on the difference between the actual permeate hydrogen pressure and the target permeate hydrogen pressure for a given instant, master PID controller 100 continually adjusts the designated permeate hydrogen output level (e.g., along the lefthand column in FIG. 9) in order to minimize this difference. In general, a low permeate hydrogen pressure indicates that the permeate hydrogen output level is too low, whereas a high permeate pressure indicates that the permeate hydrogen output level is too high. On a continual basis, at frequent intervals in the present invention's continuous feedback control loop, the control table 99 is used so as to cross-reference the designated permeate hydrogen output level and so as to determine the appropriate settings for the five process controls. Master PID controller 100 is preferably tuned such that the permeate hydrogen output level does not move faster than the ability of the subordinate PID controllers (201, 202, 203, 204, 205) to follow, thereby avoiding conditions in which the stoichiometry would change sufficiently to cause one or more components of the authothermal reformer system to operate outside of their acceptable ranges.

The present invention's first main algorithmic control component and second main algorithmic control component are autonomous versus each other. According to the present invention's second main algorithmic control component, PID controller 300 receives from pressure sensor $PS_D$ an electrical communicative signal indicative of the hydrogen delivery stream pressure. The hydrogen delivery stream pressure setpoint is input in the non-volatile component of memory 1002 of computer 1000. On a continual, feedback-loop basis, PID controller 300 adjusts motor $M_H$ so as to control the speed of the hydrogen compressor HC and thereby maintain constant pressure at the setpoint of the hydrogen delivery stream.

Figure 11:
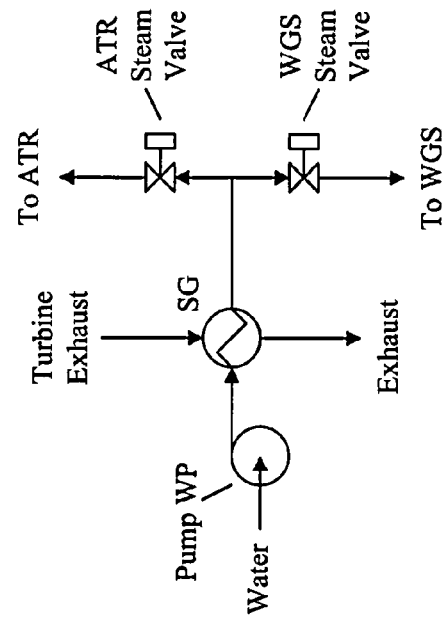
FIG. 11 is a schematic of a two-valve steam generator embodiment of the steam generator shown in FIG. 1.
Figure 10:
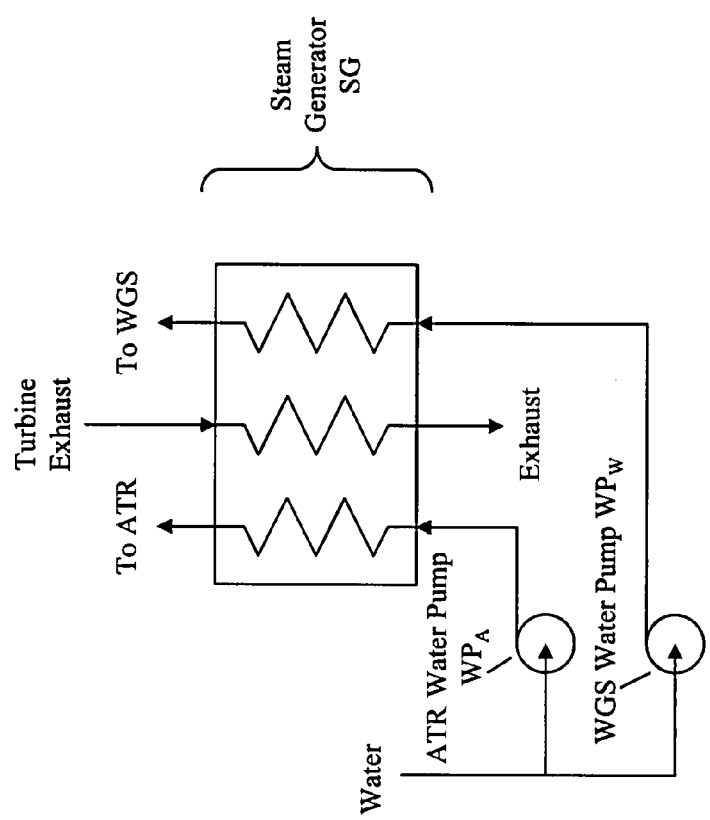
FIG. 10 is a schematic of a dual channel steam generator embodiment of the steam generator shown in FIG. 1.
Figure 13:
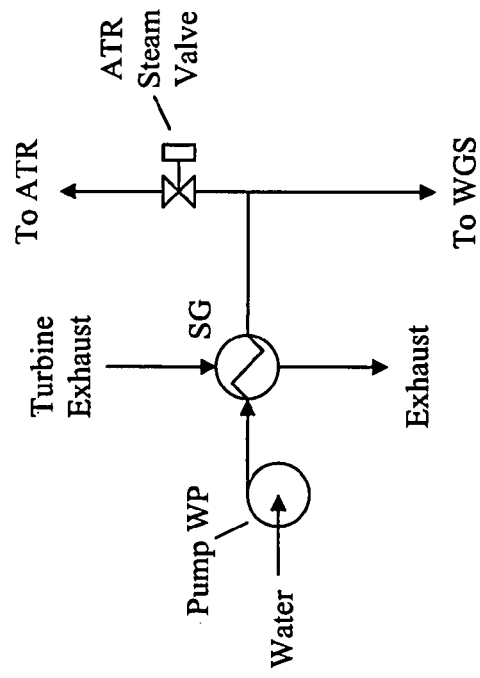
FIG. 13 is a schematic of a single valve steam generator embodiment of the steam generator shown in FIG. 1, wherein a valve is on the side of the autothermal reformer reactor.
Figure 12:
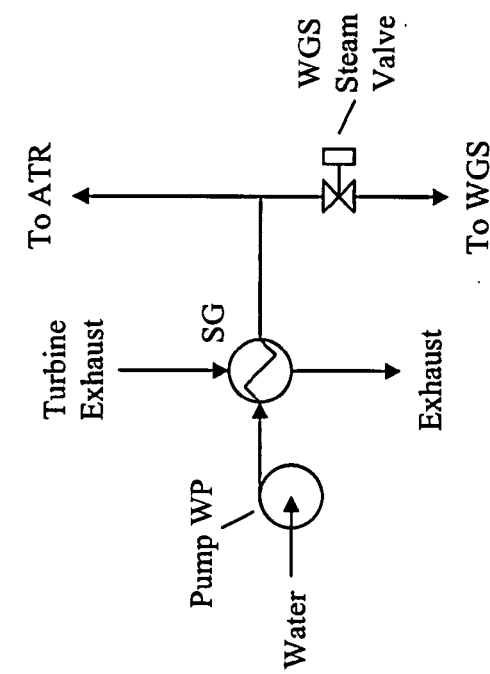
FIG. 12 is a schematic of a single valve steam generator embodiment of the steam generator shown in FIG. 1, wherein a valve is on the side of the water-gas shift reactor.

With reference to FIG. 10 through FIG. 13, there are several options for controlling the ATR steam flow rate and the WGS steam flow rate. The control system shown in FIG. 10 assumes that two separate water pumps, viz., $WP_A$ and $WP_W$, are used for the ATR and WGS steam flows, respectively, and therefore two separate steam generator SG components are used. Alternative arrangements are shown in FIG. 11 through FIG. 13, wherein a single water pump WP and a single steam generator SG are implemented, and wherein one or two valves are implemented to divide the flow between the ATR and WGS.

FIG. 11 shows a two-valve arrangement. The water pump WP is set to operate with a constant outlet pressure (through PID control or using a pressure regulating valve), and a valve is placed on each line leading to the autothermal reformer reactor ATR and the water-gas shift reactor WGS. Each valve is opened and closed, through a motor under PID control, to set the appropriate flow rate. Such an approach would have stable control because the valve position is closely correlated with steam flow rate. However, this arrangement requires slightly more hardware than does a single valve arrangement, and would be characterized by high pumping losses at low flow rates due to the constant pressure operation of the pump WP.

Alternative arrangements utilize a single valve on either the ATR line (FIG. 12) or the WGS line (FIG. 13). According to either approach, two flow rates would need to be measured. These flow rates can be any two of the following: (i) the mass flow rate of steam into the ATR; (ii) the mass flow rate of steam into the WGS; (iii) the mass flow rate of water from the water pump. Given any two of these mass-flow rates, the third can be calculated by simple addition or subtraction. The water pump is PID-controlled to deliver the total water mass flow rate based on the sum of the ATR and WGS individual steam flow rate setpoints. The valve is PID-controlled to control the flow rate of one of the steam flow rates to either the autothermal reformer reactor ATR or the water-gas shift reactor WGS. The selection of which steam line is inconsequential, because as long as the water pump is flowing the correct amount of water, and one of the reactors is receiving the correct steam flow rate, the other reactor must also be receiving the correct steam flow rate. In this case, the valve would ideally be placed on the steam line with the lower flow rate to reduce the size of the valve required, and to minimize lost pump work.

The present invention, which is disclosed herein, is not to be limited by the embodiments described or illustrated herein, which are given by way of example and not of limitation. Other embodiments of the present invention will be apparent to those skilled in the art from a consideration of the instant disclosure or from practice of the present invention. Various omissions, modifications and changes to the principles disclosed herein may be made by one skilled in the art without departing from the true scope and spirit of the present invention, which is indicated by the following claims.

What is claimed is:

1. A method for chemically processing a hydrocarbon so as to produce a high purity hydrogen stream, the method comprising:
    performing a first reaction, said first reaction including the combination of oxygen-containing gas, hydrocarbon, and steam, said first reaction further including the production of a first mixture, said first mixture containing hydrogen and carbon monoxide;
    performing a second reaction, said second reaction including the combination of steam and said first mixture, said second reaction further including the production of a second mixture, said second mixture containing hydrogen and carbon dioxide;
    performing a third reaction, said third reaction including the membrane separation of hydrogen from non-hydrogen ingredients of said second mixture so as to produce a permeate hydrogen stream and a retentate stream;
    performing a fourth reaction, said fourth reaction including the oxidation of said retentate stream, thereby producing hot and pressurized gas;
    rotating a shaft, said rotating of said shaft including using heat and pressure of said hot and pressurized gas to drive said shaft using a turbine mounted on said shaft;
    producing energy and compressed air, said energy being produced using said turbine and a generator connected to said turbine, said compressed air being produced using a compressor mounted on said shaft;
    maintaining a constant pressure of said permeate hydrogen stream, said pressure of said permeate hydrogen stream being maintained on an ongoing basis at a permeate pressure setpoint, said maintaining at said permeate pressure setpoint including using a master controller and five subordinate controllers, said five subordinate controllers controlling five subordinate setpoints, each said subordinate controller independently controlling a different one of said subordinate setpoints, the first said subordinate setpoint representing the flow rate of said oxygen-containing gas preceding said first reaction, the second said subordinate setpoint representing the flow rate of said hydrocarbon preceding said first reaction, the third said subordinate setpoint representing the flow rate of said steam preceding said first reaction, the fourth said subordinate setpoint representing the flow rate of said steam preceding said second reaction, the fifth said subordinate setpoint representing the speed of said shaft rotation, said use of said master controller and said five subordinate controllers including accessing control data contained in said master controller, said control data establishing a relationship among said five subordinate setpoints and at least three optimal output levels of said permeate hydrogen stream, said optimal output levels varying in said relationship on a scale from zero output of said permeate hydrogen stream to maximum output of said permeate hydrogen stream, each said optimal output level in said relationship having corresponding thereto a group of said five subordinate setpoints, wherein on said ongoing basis:
    a pressure sensor transmits sensory signals to said master controller, said sensory signals being indicative of said pressure of said permeate hydrogen stream;
    said master controller processes said sensory signals in relation to said control data so as to determine said optimal output level resulting in restoring said pressure of said permeate hydrogen stream to said permeate pressure setpoint, and so as to determine said group of said five subordinate setpoints that corresponds to the determined said optimal output level;
    said master controller simultaneously transmits master control signals to said five subordinate controllers, said master control signals transmitted to the first said subordinate controller being indicative of the determined first said subordinate setpoint, said master control signals transmitted to the second said subordinate controller being indicative of the determined second said subordinate setpoint, said master control signals transmitted to the third said subordinate controller being indicative of the determined third said subordinate setpoint, said master control signals transmitted to the fourth said subordinate controller being indicative of the determined fourth said subordinate setpoint, said master control signals transmitted to the fifth said subordinate controller being indicative of the determined fifth said subordinate setpoint;
    said subordinate controllers separately and simultaneously transmit subordinate control signals in accordance with said master control signals, said subordinate control signals transmitted by the first said subordinate controller being indicative of the determined first said subordinate setpoint, said subordinate control signals transmitted by the second said subordinate controller being indicative of the determined second said subordinate setpoint, said subordinate control signals transmitted by the third said subordinate controller being indicative of the determined third said subordinate setpoint, said subordinate control signals transmitted by the fourth said subordinate controller being indicative of the determined fourth said subordinate setpoint, said subordinate control signals transmitted by the fifth said subordinate controller being indicative of the determined fifth said subordinate setpoint.

2. The method for chemically processing a hydrocarbon as recited in claim 1, the method further comprising:
    cooling and compressing the permeate hydrogen stream, thereby forming a delivery hydrogen stream;
    maintaining a constant pressure of said delivery hydrogen stream, said pressure of said delivery hydrogen stream being maintained on an ongoing basis at a delivery pressure setpoint, said maintaining at said delivery pressure setpoint including:
    receiving signals indicative of said pressure of said permeate hydrogen stream;
    transmitting control signals to adjust the pressure of said delivery hydrogen stream in accordance with said delivery pressure setpoint.

3. The method for chemically processing a hydrocarbon as recited in claim 2, wherein said delivery pressure setpoint is higher than said permeate pressure setpoint.

4. The method for chemically processing a hydrocarbon as recited in claim 1, wherein said control data includes a lookup table, said lookup table being informative with respect to said relationship among said five subordinate setpoints and said optimal output level of said permeate hydrogen stream, the method further comprising creating said lookup table, said creating of said lookup table including recording optimal steady state operating data points representing said five subordinate setpoints, said optimal steady state operating data points being recorded with respect to each of at least three said optimal output levels ranging between said zero output and said maximum output.

5. The method for chemically processing a hydrocarbon as recited in claim 4, the method further comprising interpolating the recorded data to obtain additional said optimal steady state operating data points representing said five subordinate setpoints, said additional said optimal steady state operating data points being obtained with respect to at least one additional said optimal output level ranging between said zero output and said maximum output.

6. The method for chemically processing a hydrocarbon as recited in claim 5, wherein:
the producing energy includes using an energy recovery device;
the energy recovery device includes a turbine shaft, a turbine expander, a main compressor, and a generator;
the shaft rotation is rotation of the turbine shaft;
the rotation of the turbine shaft drives the generator to produce electricity;
the rotation of the turbine shaft drives the main compressor to produce compressed air.

7. A method for chemically processing a hydrocarbon in order to produce a high purity hydrogen stream, the method comprising:
using an autothermal reformer reactor to receive oxygen-containing gas, hydrocarbon, and steam and to produce a mixture containing hydrogen and carbon monoxide;
using a water-gas shift reactor to receive steam, to receive carbon monoxide produced by the autothermal reformer, and to produce a mixture containing hydrogen and carbon dioxide;
using a hydrogen membrane separator to receive hydrogen and carbon dioxide from the water-gas shift reactor and to separate hydrogen therefrom so as to produce a permeate hydrogen stream;
using an energy recovery device to receive non-hydrogen gases from the hydrogen membrane separator and to produce energy for the reformer system, the energy recovery device including a rotatable shaft;
using a master computer and five subordinate computers to continually maintain constancy of the permeate hydrogen stream at a permeate pressure setpoint, a first subordinate setpoint being controlled by the first subordinate computer and representing the mass flow rate of the oxygen-containing gas received by the autothermal reformer reactor, a second subordinate setpoint being controlled by the second subordinate computer and representing the mass flow rate of the hydrocarbon received by the autothermal reformer reactor, a third subordinate setpoint being controlled by the third subordinate computer and representing the mass flow rate of the steam received by the autothermal reformer reactor, a fourth subordinate setpoint being controlled by the fourth subordinate computer and representing the mass flow rate of the steam received by the water-gas shift reactor, a fifth subordinate setpoint being controlled by the fifth subordinate computer and representing the speed of the rotatable shaft, wherein the use of the master computer and the five subordinate computers to continually maintain said constancy includes repeatedly performing the following:
inputting, from a pressure sensor to the master computer, sensory signals indicative of the pressure of the permeate hydrogen stream;
processing, using the master computer, the sensory input in relation to control data resident in the memory of the master computer, the control data including plural output levels, on a scale from zero output to maximum output, of the permeate hydrogen stream, the control data further including the five subordinate setpoints, each output level having corresponding thereto a group of the five subordinate setpoints, the processing including correlating the sensory input to the output levels in the control data so as to select the output level in the control data that results in reinstating the pressure of the permeate hydrogen stream at the permeate pressure setpoint, the selected output level in the control data having corresponding thereto a selected group of the five subordinate setpoints;
contemporaneously outputting, from the master computer to the five subordinate computers, master control signals indicative of the selected group of the five subordinate setpoints, the first subordinate computer thereby being instructed by the master computer to establish the first subordinate setpoint in the selected group of the five subordinate setpoints, the second subordinate computer thereby being instructed by the master computer to establish the second subordinate setpoint in the selected group of the five subordinate setpoints, the third subordinate computer thereby being instructed by the master computer to establish the third subordinate setpoint in the selected group of the five subordinate setpoints, the fourth subordinate computer thereby being instructed by the master computer to establish the fourth subordinate setpoint in the selected group of the five subordinate setpoints, the fifth subordinate computer thereby being instructed by the master computer to establish the fifth subordinate setpoint in the selected group of the five subordinate setpoints.

8. The method for chemically processing a hydrocarbon as defined in claim 7, wherein an apparatus produces a delivery hydrogen stream for cooling and compressing the permeate hydrogen stream, and wherein the method further comprises using the master computer to receive signals indicative of the pressure of the delivery hydrogen stream, and to transmit control signals to adjust the pressure of the delivery hydrogen stream in accordance with the delivery pressure setpoint.

9. The method for chemically processing a hydrocarbon as defined in claim 8, wherein the delivery pressure setpoint is higher than the permeate pressure setpoint.

10. The method for chemically processing a hydrocarbon as defined in claim 7, wherein:
the energy recovery device includes the rotatable shaft, a turbine expander, a main compressor, and a generator;
the producing energy includes rotation of the rotatable shaft;
the speed of the rotatable shaft is the speed of the rotation of the rotatable shaft;
the rotation of the rotatable shaft drives the generator to produce electricity;
the rotation of the rotatable shaft drives the main compressor to produce compressed air.

11. The method for chemically processing a hydrocarbon as defined in claim 7, the method further comprising creating a lookup table the control data including the lookup table, the lookup table including the output levels and the five subordinate setpoints, the creating of the lookup table including recording optimal steady state operating data points representing the five subordinate setpoints, the optimal steady state operating data points being recorded with respect to each of at least three output levels ranging between the zero output and the maximum output.

12. The method for chemically processing a hydrocarbon as defined in claim 11, wherein:
the energy recovery device includes the rotatable shaft, a turbine expander, a main compressor, and a generator;
the producing energy includes rotation of the rotatable shaft;
the speed of the rotatable shaft is the speed of the rotation of the rotatable shaft;
the rotation of the rotatable shaft drives the generator to produce electricity;
the rotation of the rotatable shaft drives the main compressor to produce compressed air.

13. The method for chemically processing a hydrocarbon as defined in claim 11, the method further comprising interpolating the recorded data to obtain additional optimal steady state operating data points representing the five subordinate setpoints, the additional optimal steady state operating data points being obtained with respect to at least one additional output level ranging between the zero output and the maximum output.

14. The method for chemically processing a hydrocarbon as defined in claim 13, wherein:
the energy recovery device includes the rotatable shaft, a turbine expander, a main compressor, and a generator;
the producing energy includes rotation of the rotatable shaft;
the speed of the rotatable shaft is the speed of the rotation of the rotatable shaft;
the rotation of the rotatable shaft drives the generator to produce electricity;
the rotation of the rotatable shaft drives the main compressor to produce compressed air.

15. The method for chemically processing a hydrocarbon as defined in claim 13, wherein the use of the master computer and the five subordinate computers to continually maintain said constancy includes repeatedly performing individual and contemporaneous outputting, from the five subordinate computers, of subordinate control signals indicative of the selected group of the five subordinate setpoints, the first subordinate computer outputting the first subordinate setpoint in the selected group of the five subordinate setpoints, the second subordinate computer outputting the second subordinate setpoint in the selected group of the five subordinate setpoints, the third subordinate computer outputting the third subordinate setpoint in the selected group of the five subordinate setpoints, the fourth subordinate computer outputting the fourth subordinate setpoint in the selected group of the five subordinate setpoints, the fifth subordinate computer outputting the fifth subordinate setpoint in the selected group of the five subordinate setpoints.

* * * * *